(12) United States Patent
Kluge et al.

(10) Patent No.: US 7,669,822 B2
(45) Date of Patent: Mar. 2, 2010

(54) STORAGE RACK ASSEMBLY

(75) Inventors: Richard G. Kluge, Lake Geneva, WI (US); Mark A. Hunsaker, Spring Grove, IL (US)

(73) Assignee: John Sterling Corporation, Richmond, IL (US)

( * ) Notice: Subject to any disclaimer, the term of this patent is extended or adjusted under 35 U.S.C. 154(b) by 170 days.

(21) Appl. No.: 11/978,848

(22) Filed: Oct. 30, 2007

(65) Prior Publication Data
US 2009/0108160 A1 Apr. 30, 2009

(51) Int. Cl.
*F16B 45/00* (2006.01)
(52) U.S. Cl. ............. 248/308; 248/284.1; 248/304; 248/306; 248/317; 248/324; 248/339; 211/18; 211/87.01
(58) Field of Classification Search ............. 248/284.1, 248/304, 306, 308, 317, 324, 339; 211/87.01, 211/18
See application file for complete search history.

(56) References Cited

U.S. PATENT DOCUMENTS

| | | | | | |
|---|---|---|---|---|---|
| 2,500,881 | A | * | 3/1950 | Stader | 211/85.3 |
| 2,778,588 | A | * | 1/1957 | Bruno | 248/112 |
| 3,153,526 | A | * | 10/1964 | Pawsey | 248/219.1 |
| 3,484,069 | A | * | 12/1969 | Larson | 248/220.42 |
| 3,941,250 | A | * | 3/1976 | Ott | 211/1.3 |
| 4,101,107 | A | * | 7/1978 | Antoszewski | 248/218.4 |
| 5,078,276 | A | * | 1/1992 | Rogge et al. | 211/18 |
| 5,332,104 | A | * | 7/1994 | Santella | 211/18 |
| 5,769,294 | A | * | 6/1998 | Heinz et al. | 224/567 |
| 6,196,509 | B1 | * | 3/2001 | Clemens | 248/302 |
| 6,494,327 | B2 | * | 12/2002 | Huang | 211/17 |
| 6,823,999 | B2 | * | 11/2004 | Heneveld, Sr. | 211/87.01 |
| 6,983,853 | B1 | * | 1/2006 | Fickett | 211/18 |

OTHER PUBLICATIONS

Single Drawing Sheet labeled Fig. A (Prior Art).
Single Drawing Sheet labeled Fig. B (Prior Art).
Single Drawing Sheet labeled Fig. C (Prior Art).

* cited by examiner

*Primary Examiner*—J. Allen Shriver, II
*Assistant Examiner*—Michael McDuffie
(74) *Attorney, Agent, or Firm*—Wood, Phillips, Katz, Clark & Mortimer

(57) ABSTRACT

A wall-mounted storage rack assembly facilitates storage of articles such as bicycles, lawn care implements, tools, and the like by providing a pair of independently pivotally movable support arms, which are pivotally supported on an associated mounting bracket. The support arms are independently movable about respective pivot axes arranged in intersecting, angular relationship to each other, whereby in a lowered position of the support arms, they are arranged in a generally V-shaped, diverging orientation, while in a raised position of the support arms, they are positioned more closely together in a relatively compact configuration. By this compact configuration, efficient storage, shipment, and display for retail sales of the storage rack assembly is promoted.

4 Claims, 8 Drawing Sheets

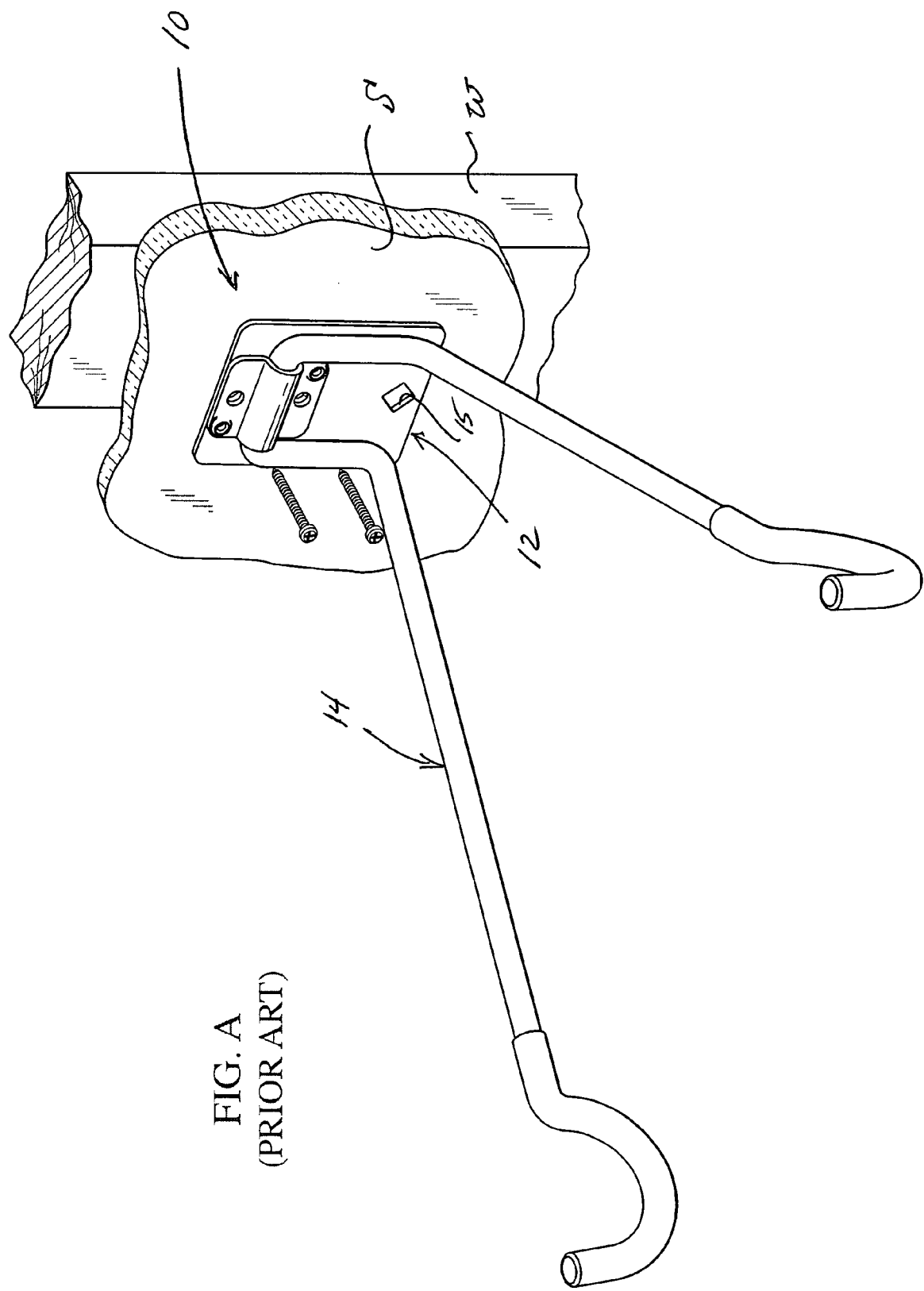
FIG. A
(PRIOR ART)

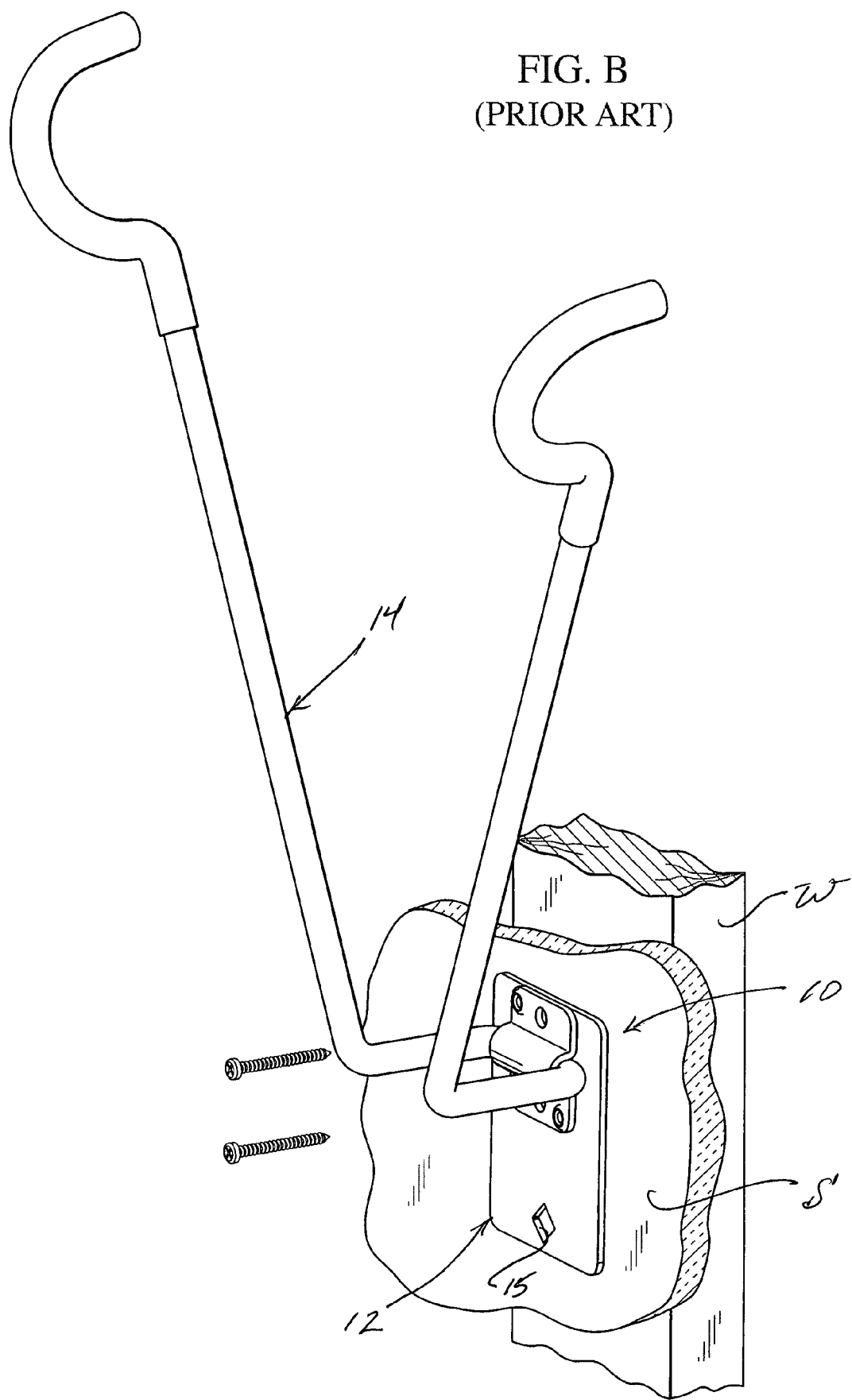
FIG. B
(PRIOR ART)

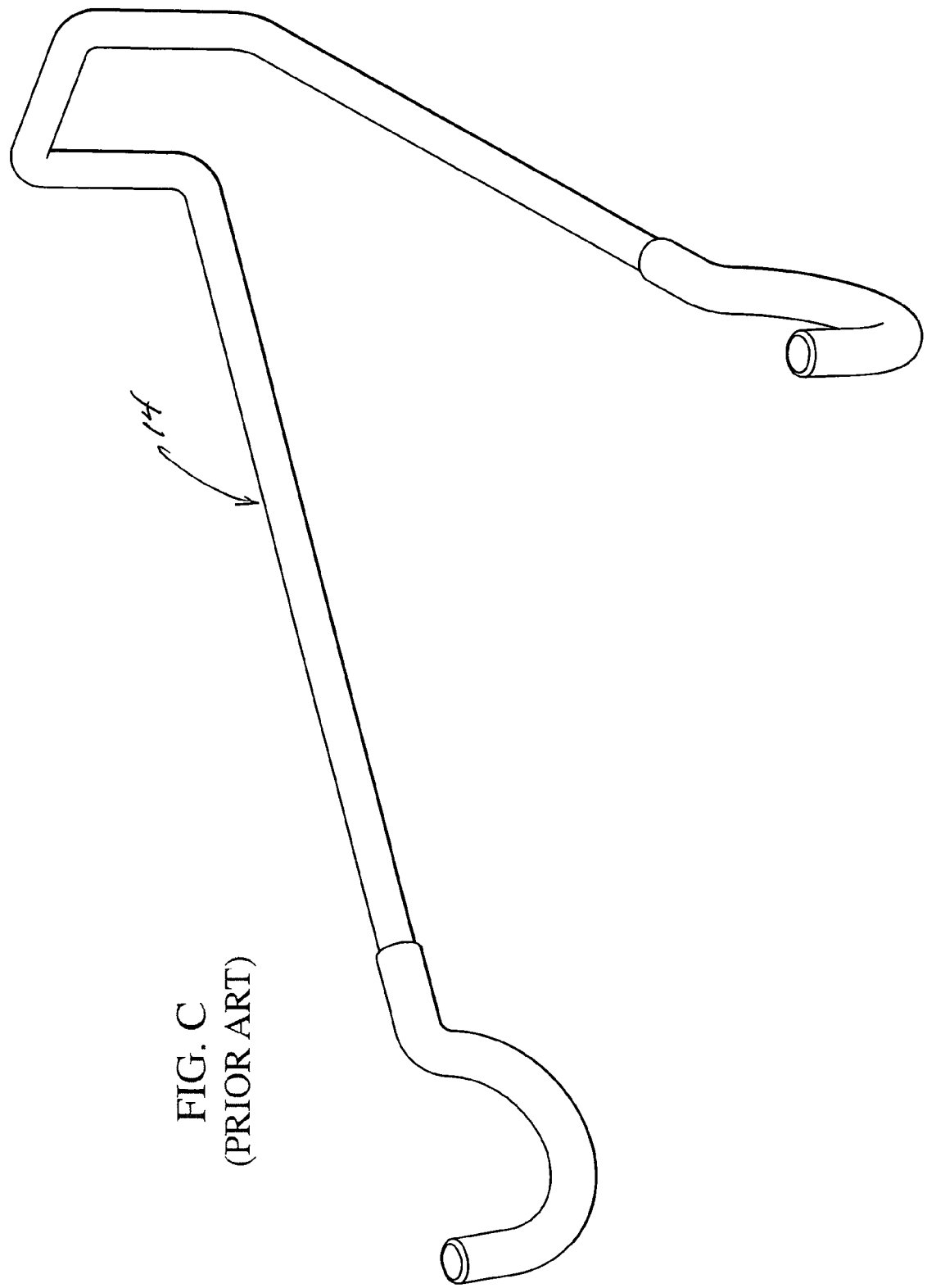
FIG. C
(PRIOR ART)

STORAGE RACK ASSEMBLY

BACKGROUND OF THE INVENTION

The present invention relates generally to storage rack arrangements for storage of articles on an associated wall or like supporting surface, and more particularly to a storage rack assembly configured for wall-mounted storage of a bicycle or like article, wherein the assembly includes a pair of independently pivotal support arms movable about respective pivot axes arranged in an angular relationship. The support arms can be positioned to provide the assembly with a relatively compact configuration to facilitate efficient shipment and display for consumer purchase, with the support arms being easily movable to a generally diverging configuration to facilitate wall-mounted storage of articles.

TECHNICAL FIELD

Arrangements to facilitate wall-mounted storage of articles, such as tools, garden implements, bicycles, and like articles typically found in the household, facilitate convenient and efficient storage of such articles, while at the same time permitting ready access to the articles for use. Various types of wall-mounted hooks, racks, and shelves are known for facilitating storage of household articles in this fashion.

One arrangement that has met with widespread success in the marketplace is a wall-mounted storage rack assembly including a pair of diverging support arms which are configured to facilitate wall-mounted storage of a bicycle or like article. In this previous arrangement, the support arms of the rack assembly are formed as a generally V-shaped unitary member, including a base portion pivotally mounted to an associated mounting bracket, with the support arms of the arrangement extending in a diverging fashion outwardly from the base portion. The support arms can be pivotally moved about the base portion between a generally upwardly extending orientation when not in use, and a generally horizontally, outwardly extending configuration, whereby a bicycle or like article can be easily supported and stored on the diverging support arms.

While this arrangement has met with widespread commercial success, it will be appreciated that the generally V-shaped configuration of the support arms dictates the overall size of the rack assembly during shipment, storage, and display for consumer purchase. As will be appreciated, minimizing the size of an article promotes efficient shipment and display, with the storage rack assembly of the present invention particularly configured to provide a relatively compact configuration for shipment and display, while maintaining the desired functionality of the rack assembly, in comparison to previously-known arrangements.

SUMMARY OF THE INVENTION

A storage rack assembly embodying the principles of the present invention is particularly suited for wall-mounted storage of a bicycle or like article, and to this end, includes a pair of support arms which can extend in generally diverging relationship from an associated mounting bracket. Notably, because the support arms are configured for independent pivotal movement with respect to the mounting bracket about respective pivot axes arranged in angular relationship to each other, the storage rack assembly can desirably be easily manipulated, and folded and collapsed to a compact configuration which promotes efficient storage, shipment, and display such as by hanging, for consumer purchase.

In accordance with the illustrated embodiment, the present storage rack assembly comprises a mounting bracket configured for mounting on an associated support surface such as a wall or the like. The storage rack assembly further includes a pair of support arms pivotally mounted on the support bracket for independent, pivotal movement about respective pivot axes. In the illustrated embodiment, the mounting bracket includes a base plate, and a pivot bracket secured thereto, with a proximal portion of each of the support arms positioned in captive relationship between the pivot bracket and base plate for independent pivotal movement. The base plate, in turn, preferably comprises a metallic facing member and a backing member molded from polymeric material.

In the preferred form, the mounting bracket defines a pair of generally planar surfaces arranged at an angle, with the pivot axes of the support arms arranged in angular relationship to each other. The pivot axes are preferably intersecting, and arranged at an obtuse angle with respect to each other.

By this arrangement, each of the support arms is pivotally movable between a first, raised position, and a second, lowered position. In the lowered position of each arm, the arms extend in generally diverging relationship from the mounting bracket, with distal portions of the support arms thus configured to cooperate with each other to support an associated object, such as the frame of a bicycle. Of course, it is within the purview of the present invention that other articles can be similarly positioned on the support arms when they are in their lowered position.

By virtue of the angular relationship of the pivot axes of the support arms, the support arms can be moved from their second position, where they are in generally diverging relationship, to their first position, wherein the distal portions of the support arms are positioned much more closely together than when they are in their lowered position for article storage. As such, the support arms can be positioned in the raised position when the wall-mounted rack assembly is not in use, and can be similarly positioned, typically in an inverted orientation, when the storage rack assembly is positioned for display in a retail establishment for consumer purchase.

In the preferred embodiment, the proximal portion of each support arm includes a generally horizontal leg pivotally mounted on the associated mounting bracket, and a generally vertical leg, extending downwardly from the horizontal leg in the lowered position of the support arm. By this arrangement, the vertical leg of each support arm is thus positioned for engagement with the mounting bracket, in the second position of each support arm, whereby the distal portion of each support arm extends in generally cantilevered fashion from the mounting bracket. Secure, stable support of articles to be stored on the rack assembly is thus achieved.

In the preferred form, the distal portion of each support arm defines a recessed region, which may be generally arcuately configured, for accommodating support of an associated article, such as the frame of a bicycle.

Other features and advantages of the present invention will become readily apparent from the following detailed description, the accompanying drawings, and the appended claims.

Figure 1:
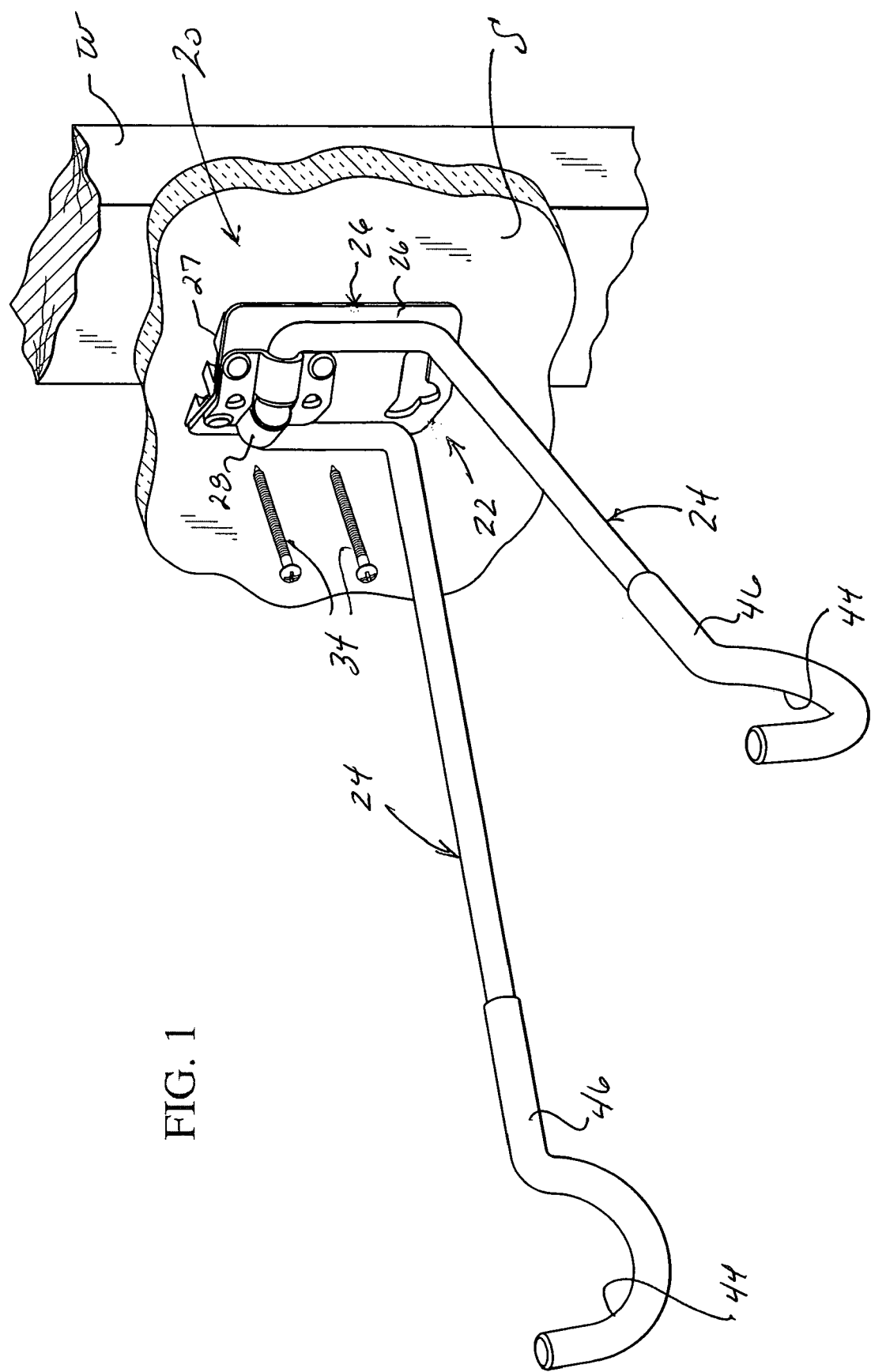
FIG. 1 is a perspective view of a storage rack assembly embodying the principles of the present invention, showing the assembly in an orientation for wall-mounted support of an associated article.
Figure 2:
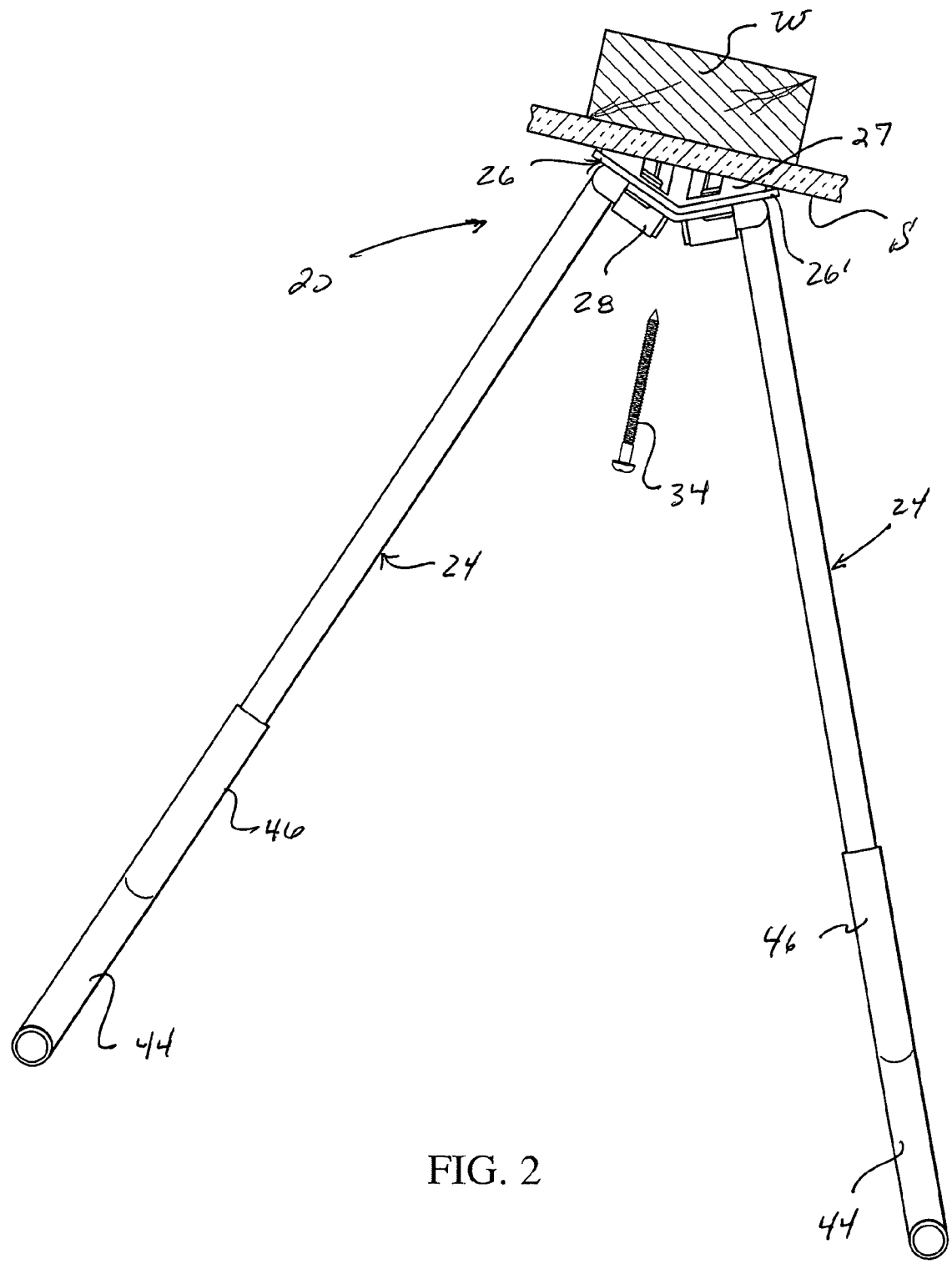
FIG. 2 is a top plan view of the storage rack assembly shown in FIG. 1.

FIG. A is a perspective view of a prior art storage rack assembly;

FIG. B is a further perspective view of a prior art storage rack assembly; and

FIG. C is a perspective view of a support arm member of the prior art storage rack assembly illustrated in FIGS. A and B.

DETAILED DESCRIPTION

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

With reference first to FIGS. A, B, and C, therein is illustrated a prior art storage rack assembly 10. Storage rack assembly 10 is particularly configured for wall-mounted storage of articles such as bicycles, lawn care implements, household tools, and the like. To this end, the storage rack assembly 10 includes a pair of suitable mechanical fasteners by which the rack assembly can be securely mounted on an associated support surface S, such as a wall or the like, with the rack assembly preferably positioned in operative association with a wooden stud W or the like of the wall structure, whereby the mechanical fasteners of the rack assembly can extend through the support surface and into the wooden stud W for secure mounting.

This prior art storage rack assembly includes a mounting bracket 12 on which is pivotally mounted a support arm member 14, which is generally V-shaped, and includes a pair of generally diverging support arms upon which articles to be supported can be positioned. The diverging configuration of the support arms of member 14 facilitate secure wall-mounting, providing spaced apart support points for the article so that it is stably positioned on the associated wall structure.

By virtue of the manner in which the support arms of member 14 are of a unitary nature, and pivot in unison with respect to the associated mounting bracket 12, the support arms maintain their generally diverging configuration whether the member 14 is in its lowered, use position, as shown in FIG. A, or in its raised, non-use position, as shown in FIG. B. As will be appreciated, the unitary nature of the support arm member thus dictates the general overall width dimension of the prior art storage rack assembly.

While FIG. B illustrates the support arm member 14 in a raised orientation, it will be appreciated that during product display, the storage rack assembly 10 is typically displayed while hanging from an associated rod or hook, such as by hanging from display opening 15. Thus, during product display, storage rack assembly 10 would be positioned in a generally inverted orientation with respect to the orientation shown in FIG. B, with the support arm member 14 extending generally downwardly, and with the support arms thereof arranged in generally diverging relationship. Because of this, convenient and efficient display of storage rack assembly 10 is not promoted.

With reference now to FIGS. 1-6, therein is illustrated an improved storage rack assembly 20 embodying the principles of the present invention. Notably, as will be further described, storage rack assembly 20 includes a pair of independently pivotally movable support arms, which are arranged for independent pivotal movement about respective pivotal axes arranged in angular relationship to each other. As such, the support arms of the storage rack assembly 10 can be positioned in the desired diverging relationship to each other while in use, but can be independently pivotally moved and folded about their respective axes so that the support arms are moved to a relatively compact, non-diverging orientation, to thereby facilitate storage, shipment, and display of the storage rack assembly for consumer purchase.

The storage rack assembly includes a mounting bracket 22 configured for securement to an associated support surface S, such as a wall or the like, with secure mounting of the storage rack assembly facilitated by mounting in operative association with a wooden stud W or like element of the wall structure. The storage rack assembly further includes a pair of independently pivotal support arms 24 which can be positioned in a generally horizontal, outwardly diverging orientation, whereby an associated article to be stored can be easily supported upon the support arms.

In the illustrated embodiment, the mounting bracket 22 comprises a base plate 26, and an associated pivot bracket 28 secured in fixed relationship to the base plate 26. The base plate 26 preferably comprises a composite construction including a metallic facing member 26' against which pivot bracket 28 abuts, and a backing member 27, preferably molded from polymeric material, positioned behind the facing member. As illustrated, the facing member 26' of the base plate 26 defines a pair of generally planar faces, arranged at an angle, preferably obtuse, with the pivot bracket 28, in turn, defining a pair of generally semi-cylindrical bearing surfaces, which surfaces are oriented at an angle similar to that defined by the faces of the base plate 26. A plurality of mechanical fasteners, which may have a rivet-like configuration, extend through the pivot bracket 28, the facing member 26', and the backing member 27 to permanently secure the pivot bracket 28 to the base plate 26. In the preferred embodiment, backing member 27 of the base plate 26 defines a plurality of reinforcing bosses 32 (FIG. 6) respectively positioned adjacent to the mechanical fasteners 30 to enhance the rigidity and strength of the mounting bracket of the rack assembly.

The storage rack assembly can include a pair of mechanical fasteners 34, which are configured to extend through the pivot bracket 28, through facing member 26' and backing member 27 of the base plate 26, and through the associated support surface S, and into wooden stud W. Securement of the mounting bracket 22 to the associated support surface in this fashion acts to provide the desired stable mounting of the bracket, since an article to be stored on the rack assembly is supported in generally cantilevered fashion on the support arms 24.

Figure 3:
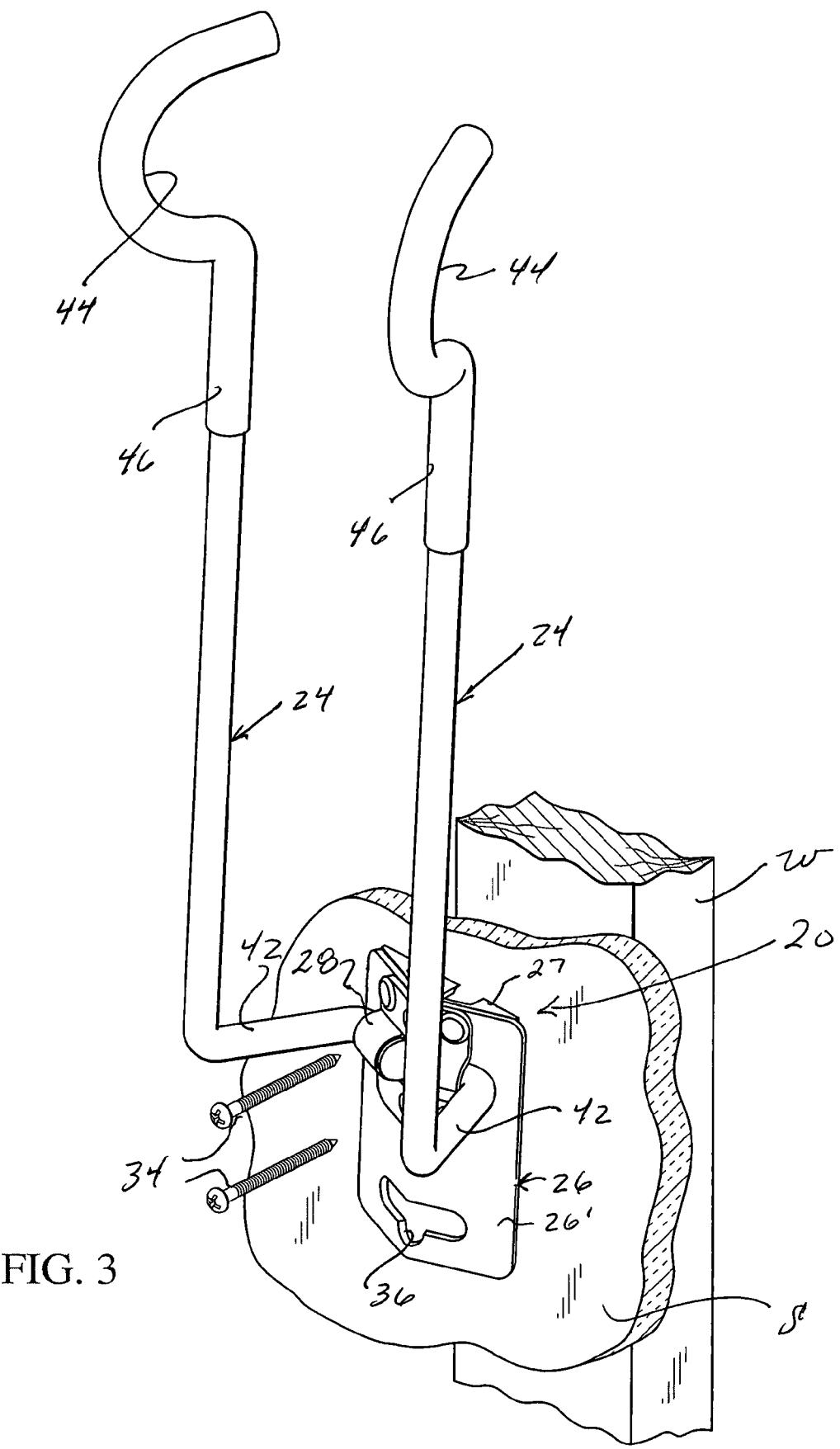
FIG. 3 is a further perspective view of the present storage rack assembly showing support arms thereof in a raised position, as the storage rack assembly may be arranged when not in use.
Figure 4:
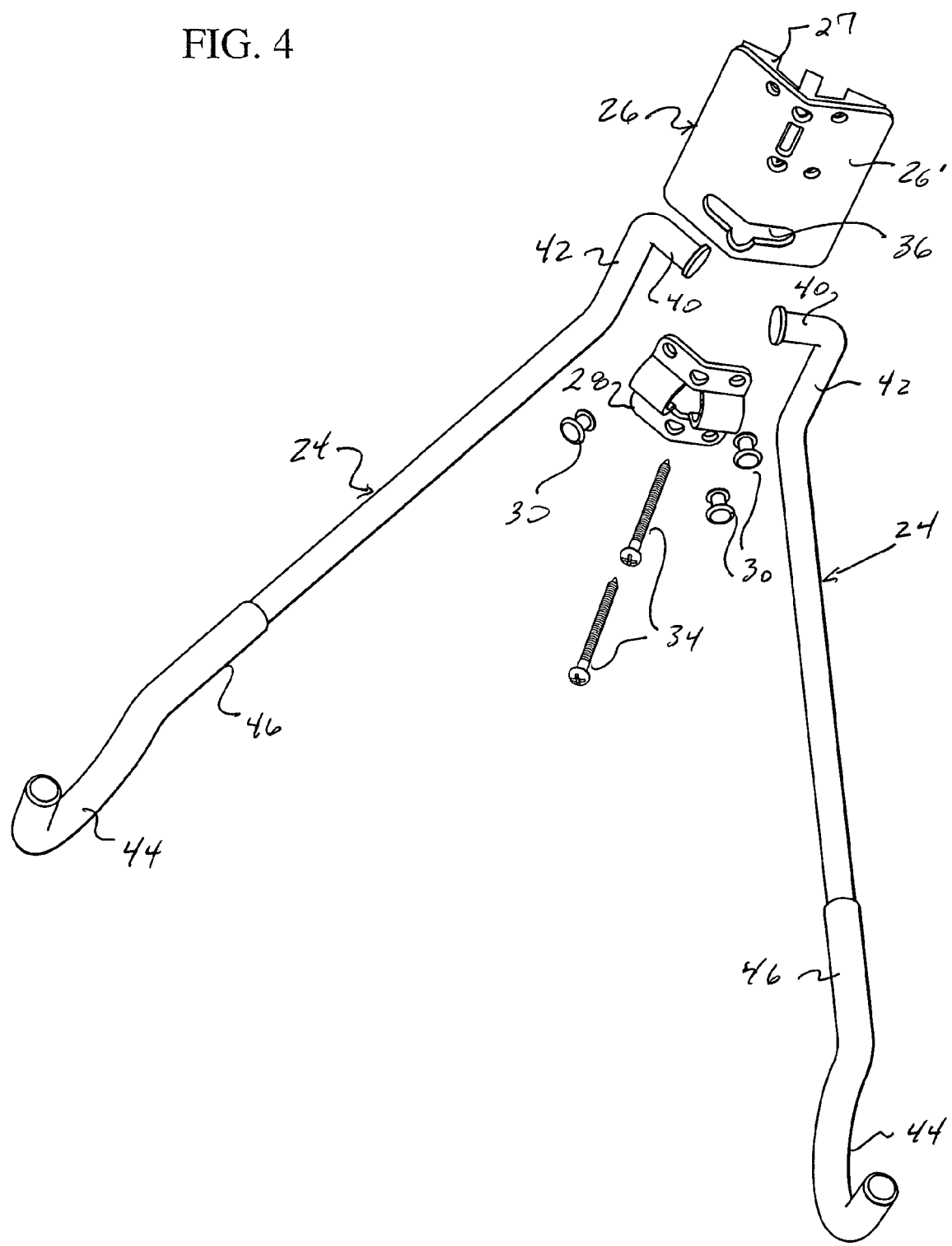
FIG. 4 is a exploded, perspective view of the present storage rack assembly.
Figure 5:
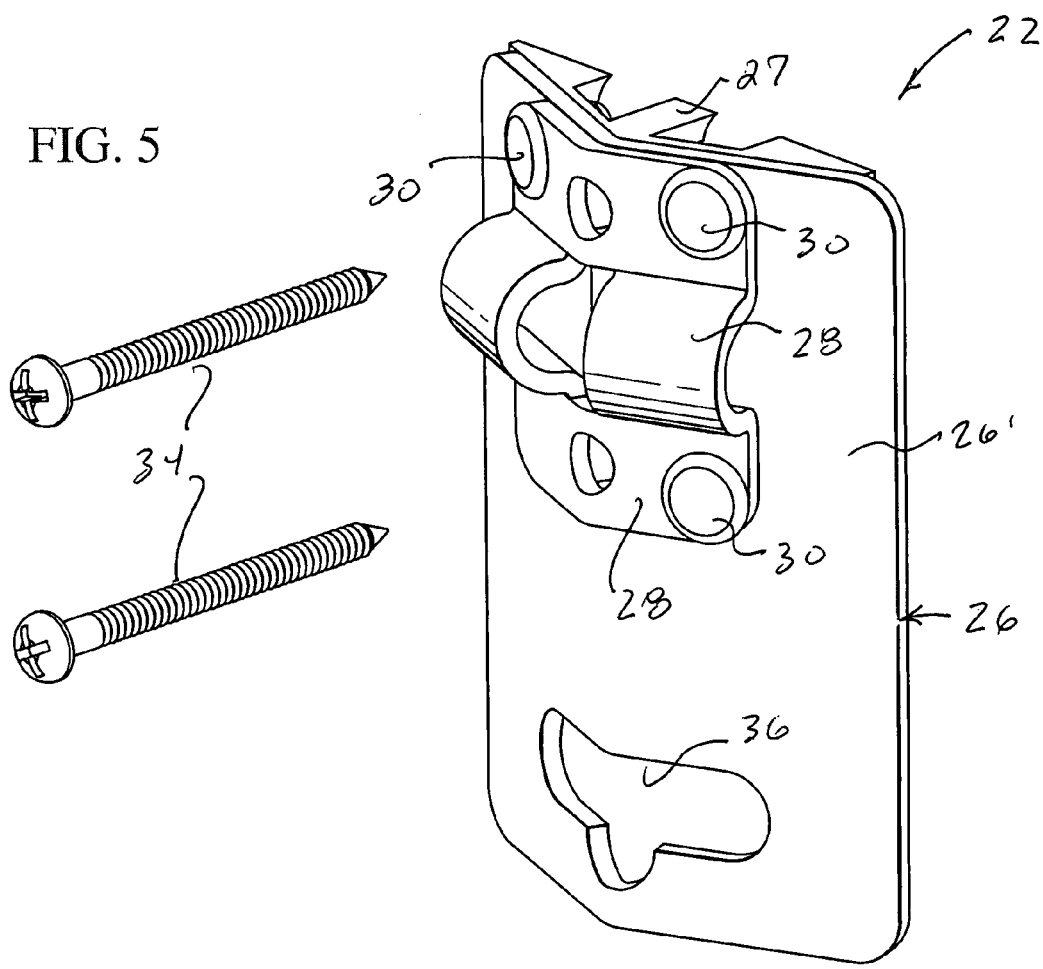
FIG. 5 is a relatively enlarged, perspective view of a mounting bracket of the present storage rack assembly.
Figure 6:
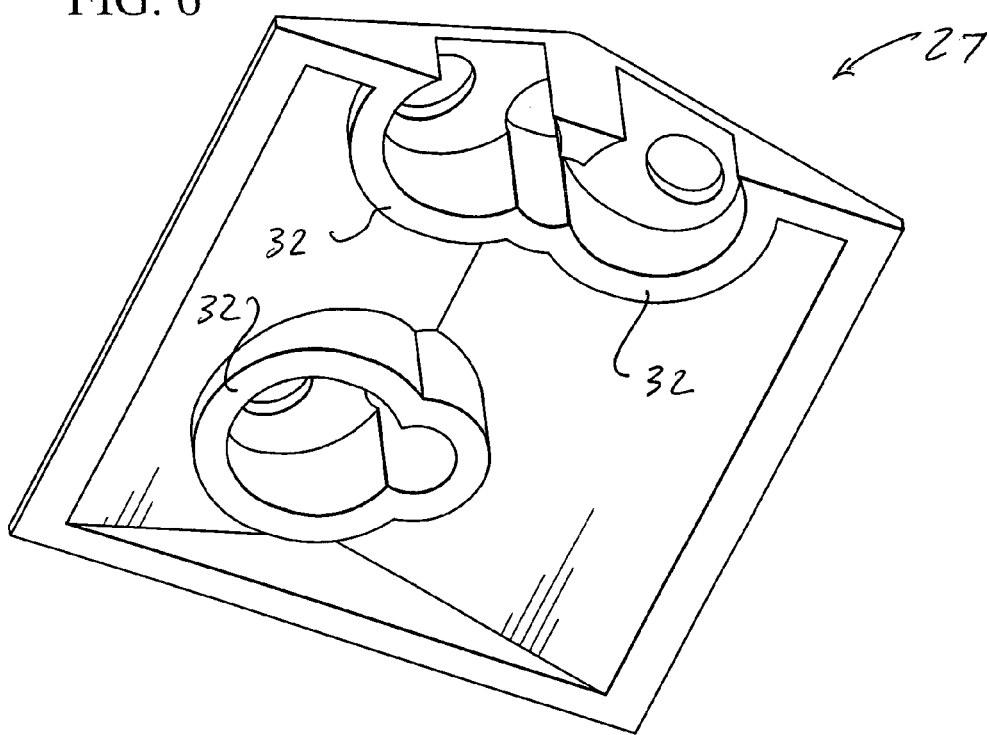
FIG. 6 is a perspective view of the rear of a base plate of the mounting bracket assembly shown in FIG. 5.

Notably, base plate 26 may define a display opening 36 in the facing member 26', which facilitates display of the storage rack assembly for retail sale in a generally inverted orientation to that shown in FIG. 3. Display opening 36 permits the storage rack assembly to be readily and conveniently displayed, in such an inverted orientation, with the support arms 34 thereof extending generally downwardly from the mounting bracket 22. Efficient display of the present storage rack assembly is thus promoted, facilitating convenient inspection and selection by consumers, while permitting retailers to maximize use of their retail display space.

As noted, support arms 24 are mounted for independent, pivotal movement with respect to mounting bracket 22. In particular, the support arms 24 are each movable between a first, raised position, as illustrated in FIG. 3 (also the position in which they are oriented during display in a relatively inverted orientation of the storage rack assembly), and a second, lowered position as shown in FIG. 1, wherein the support arms are configured to receive and support an article thereon.

To this end, each support arm 24 includes a proximal portion having a horizontal leg 40 which is held in captive relationship between a respective one of the bearing surfaces of pivot bracket 28, and the associated base plate 26. Each horizontal leg 40 includes a relatively enlarged end portion, by which the support leg is maintained in captive relationship between the pivot bracket 28 and the base plate.

The proximal portion of each support arm 24 further includes a generally vertical leg 42, extending downwardly from the horizontal leg in the second, lowered position of the support arm 24. By this arrangement, the vertical leg 42 of each support arm is positioned for abutting engagement with the facing member 26' of the base plate 26 of mounting bracket 22 when the support arm is in its lowered position, thus coacting with horizontal leg 40 to firmly and stably secure each support leg in its load-bearing lowered position.

Each support arm 24 further includes a distal portion which extends in a generally cantilevered fashion from vertical leg 42 of the proximal portion of the support leg. The distal portion of each support leg preferably defines a recessed region 44 adjacent the free end thereof, which recess portion may be generally arcuately shaped so as to facilitate support of the frame of a bicycle, or a like, generally cylindrical article. A protective coating 46, such as a suitable vinyl material, is preferably provided on the support arm 24 at the recessed portion thereof to protect the finish of an article being supported by the storage rack assembly.

By virtue of the manner in which the support arms 24 of the present storage rack assembly are independently pivotally movable about respective axes arranged in obtuse, intersecting, angular relationship to each other, the support arms can be moved from the lowered position, such as illustrated in FIG. 1, to the raised position, illustrated in FIG. 3, with the distal portions of the support arms being spaced further apart from each other in the lowered position than in the raised position. Thus, in the lowered position, the support arms can stably support a bicycle, or like article, in generally cantilevered fashion from the associated support surface. When the storage rack assembly is not in use, or such as during display of the rack assembly for retail sale, the storage arms 24 can be moved to their raised position, wherein the distal portions of the storage arms are positioned relatively close to each other, thus providing the storage rack assembly with the desirably compact, overall configuration. Again, in this position of the support arms as illustrated in FIG. 3, the storage rack assembly can be hung for retail display in a relatively inverted orientation from display opening 36.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A storage rack assembly comprising:
   a mounting bracket configured for mounting on an associated support surface, said mounting bracket including a base plate, and a pivot bracket, having a pair of bearing surfaces, secured to said base plate; and
   a pair of support arms pivotally mounted on said mounting bracket for independent pivotal movement with respect to each other about respective pivot axes arranged in obtuse angular, intersecting relationship to each other,
   each of said support arms being pivotally moveable between a first, raised position, and a second, lowered position,
   each of said support arms including a proximal portion pivotally mounted on said mounting bracket between said base plate and a respective one of said bearing surfaces of said pivot bracket, and a distal portion extending outwardly from said mounting bracket in the lowered position of the support arm, so that in the lowered position of each of said support arms, said support arms cooperate to support an associated object on the distal portions thereof,
   said proximal portion of each said support arms including a generally horizontal leg pivotally mounted on said mounting bracket between said base plate and said pivot bracket, and generally vertical leg, extending downwardly from said horizontal leg in the lowered position of the support arm, for engagement with said mounting bracket in the second position of each of said support arms,
   wherein in said second, lowered position of said support arms, said support arms extend from said mounting bracket in diverging relationship to each other to support an associated object on the distal portions thereof, while in said first, raised position said support arms extend from said mounting bracket in generally adjacent relationship to each other with the distal portions of said support arms more closely spaced to each other than in said second, raised position of said support arms to facilitate shipment and display of said storage rack assembly.

2. A storage rack assembly in accordance with claim 1, wherein:
   said base plate includes a facing member against which said pivot bracket abuts, and a backing member positioned behind said facing member,
   said mounting bracket including a plurality of mechanical fasteners securing said pivot bracket to said base plate, said backing member including a plurality of reinforcing bosses respectively positioned adjacent to said mechanical fasteners.

3. A storage rack assembly in accordance with claim 1, including:
   a plurality of mechanical fasteners which can extend through said base plate and pivot bracket of said mounting bracket for securing said mounting bracket to an associated support surface.

4. A storage rack assembly in accordance with claim 1, wherein:
   the distal portion of each said support arm defines a generally arcuate, recessed region for accommodating support of an associated object.

* * * * *

UNITED STATES PATENT AND TRADEMARK OFFICE
CERTIFICATE OF CORRECTION

PATENT NO. : 7,669,822 B2 Page 1 of 1
APPLICATION NO. : 11/978848
DATED : March 2, 2010
INVENTOR(S) : Richard G. Kluge It is certified that error appears in the above-identified patent and that said Letters Patent is hereby corrected as shown below:

Column 6, line 41, "raised" should be -- lowered --

Signed and Sealed this

First Day of June, 2010

David J. Kappos
*Director of the United States Patent and Trademark Office*